March 30, 1954     H. A. SKOG     2,673,584
FRUIT PITTING MECHANISM Filed May 7, 1947     8 Sheets-Sheet 3

INVENTOR.
Henry A. Skog
BY Moore, Olson & Trexler
Attys.

INVENTOR.
Henry A. Skog
BY
Moore, Olson & Trexler
attys.

March 30, 1954  H. A. SKOG  2,673,584
FRUIT PITTING MECHANISM
Filed May 7, 1947                                    8 Sheets-Sheet 6

INVENTOR.
Henry A. Skog
BY
Moore, Olson & Trexler
attys.

March 30, 1954     H. A. SKOG     2,673,584
FRUIT PITTING MECHANISM

Filed May 7, 1947     8 Sheets-Sheet 7

INVENTOR.
Henry A. Skog
BY
Moore, Olson & Trexler
attys.

Patented Mar. 30, 1954

2,673,584

UNITED STATES PATENT OFFICE 2,673,584

FRUIT PITTING MECHANISM

Henry A. Skog, Olympia, Wash., assignor to Special Equipment Company, Portland, Oreg., a corporation of Oregon Application May 7, 1947, Serial No. 747,299

16 Claims. (Cl. 146—28)

This invention relates to pitting mechanisms for pitting peaches and the like.

Among the objects of the present invention is to provide a device for cutting out the seed section of a half fruit and more particularly for pitting half peaches wherein the pitting or seed section excising is carried out by mechanism which eliminates the necessity for raising and lowering the seed section excising or pitting head, thereby permitting a faster seed section excising or pitting and likewise permitting the utilization of seed section excising or pitting mechanism in connection with a continuously moving fruit holder which will effect seed section excising or pitting without stopping the progress of the fruit holder.

Yet another object of the invention resides in providing a pitting mechanism that is particularly utilizable in connection with a continuous pitting operation which eliminates the necessity for raising and lowering the relatively heavy pitting head mechanism thereby eliminating undue wear on the mechanical parts.

Yet another object of the invention resides in providing a pitting mechanism wherein the pitting head carrying the pitting mechanism is adapted to swing back and forth relatively gently on pivotally mounted arms and wherein the pitting movement is synchronized in connection with fruit holding mechanism which is movable toward and away from the swinging pitter head whereby to permit the execution of the pitting operation without stopping the feeding of the fruit.

Yet another object of the invention is to provide a fruit pitting mechanism particularly for half peaches, wherein the fruit holder carrying the half fruit is raised into contact with the movable pitting mechanism, thereby providing a more gentle pitting action and eliminating the weight of the pitting head on the cut face of the half fruit, and thereby forming a better appearing pit cavity in the cut face of the half fruit.

Still another object of the present invention resides in providing a pitting mechanism for pitting a half fruit wherein the half fruits are continuously advanced at a predetermined rate of travel past the pitting station and wherein at the pitting station a pitting head is arcuately reciprocable over the path of travel of the half fruits in synchronized manner, the arrangement being such that each travelling half fruit, as it reaches the pitting mechanism, is raised into contact with the moving pitting mechanism and moved along with the pitting mechanism, and during such time the pitting operation takes place without interrupting the continuous flow of the half peaches past the pitting mechanism.

Still another object of the invention resides in the novel manner of swingably mounting the pitting head or pitting mechanism carrier so that it moves upwardly on a rising arc as the half fruit passes along therebeneath, the arrangement being such that the half fruit is raised into contact with the arcuately rising pitter carrier and moves along therewith at the same speed, thereby providing an opportunity for the actuation of the pitting mechanism on the cut face of the travelling half fruit so that the pitting operation is carried out in a continuous manner and without interrupting the travel of the half fruit past the pitting station.

These and other objects of the invention will be apparent from a perusal of the following specification when taken in connection with the accompanying drawings, wherein.

In the specific embodiment of the invention, the machine is shown in its simplest form as a repitter for removing half pits from previously cut half fruits, such as half peaches. It is to be understood that the broad principles of the invention are applicable to other types of machines for pitting fruits, including both half fruits and whole fruits. The broader features of the invention, for instance, are adaptable for pitting cherries as well as peaches or half peaches.

Figure 1:
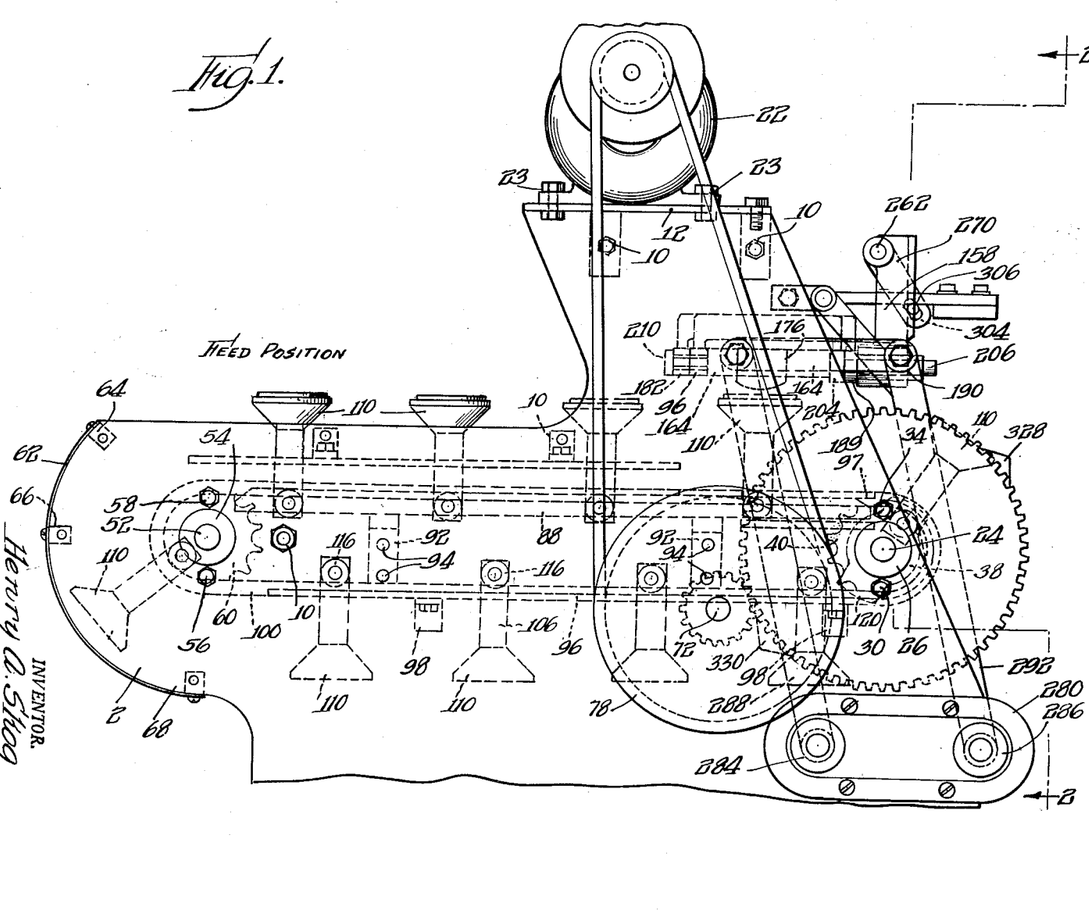
Figure 1 is a side elevation of the complete machine embodying the invention.
Figure 2:
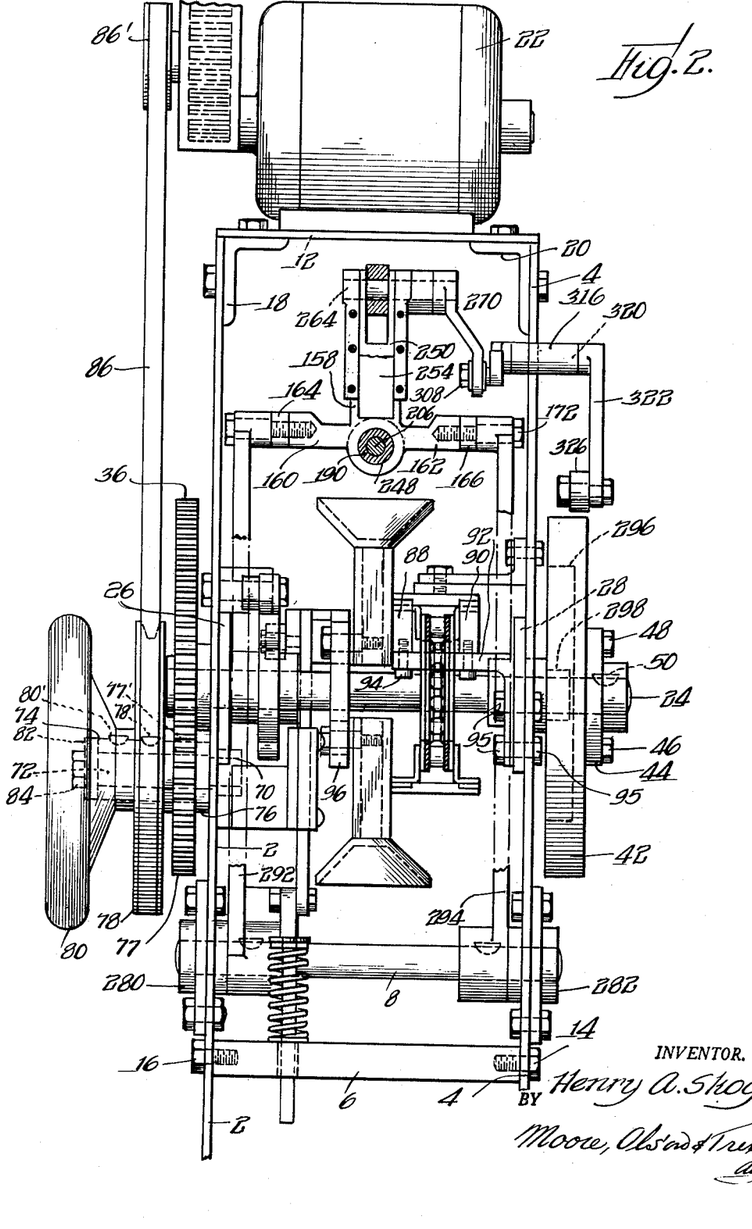
Figure 2 is an enlarged vertical right hand sectional view of the machine at the distribution end thereof taken on the line 2—2 of Figure 1.

In the illustrated embodiment the machine is shown as comprising a pair of spaced apart, vertically disposed side plates 2 and 4 which are maintained in spaced apart assembled relation by cross rods 6, 8 and 10, see Figures 1 and 2. In addition, a top plate 12 assists in cross supporting the side uprights. The cross rods 6 and 8 and 10 are secured by bolts as at 14 and 16 and the top plate is secured by suitable bolts, shown but not numbered, to the corner brackets 18 and 20. This top plate 12 also forms the base for the gear head motor 22 which drives the entire machine. This motor is secured by the bolts 23, see Figure 1.

The machine in general embodies a conveyor herein shown as an endless conveyor disposed horizontally to carry an endless series of spaced apart cups along the upper reach of the endless horizontal conveyor beneath a pitting station, and after the half fruits with half pits therein and carried by the cups are pitted, the cups pass along the generally horizontal reach and then dip downwardly at the discharge side of the machine and return in inverted relation back to the forward end of the machine. The discharge end of the machine is provided with a shaft 24 which is journalled in the bearings 26 and 28, see Figure 2. These bearings are secured to the side plates 2 and 4 by bolts 30 and 34, see Figure 1. The shaft 24 has keyed to it at one end a gear 36 which, as shown in Figure 2, lies outside the side plate 2. Between the plates, and located on this same shaft 24, is keyed the cam 38 and a sprocket 40. On the outside of the plate 4 a cam 42 is rotatably mounted on shaft 24 and this cam is attached to an adjusting collar 44 by bolts 46 and 48. The collar 44 is secured to the shaft 24 by the key 50.

The opposite or feed end of the machine is provided with a shaft 52 journalled in bearings 54 which are secured to the side plates 2 and 4 by bolts 56 and 58. A sprocket 60 is secured to this shaft 52. In addition, a guard plate 62 is secured to the brackets 64, 66 and 68.

Secured to the side plates 2 by a nut 70 is a short stationary stub shaft 72 about which is rotatably mounted a sleeve 74 which sleeve is provided with a shoulder 76. A pinion 77 is keyed as at 77' to this sleeve 74. In addition, a pulley 78 and a hand wheel 80 are likewise keyed to the sleeve as at 78' and 80'. A retaining washer 82 is secured to the end of shaft 72 by the nut 84 whereby to hold the assembly in place on the shaft 72.

The pulley 78 is driven by means of a V-belt 86 from the gear head motor 22 by means of the second pulley 86' connected to the gear head motor. Since the pulley 78 and the gear pinion 77 are keyed to the sleeve 74, any rotation imparted to the pulley 78 will cause the pinion or gear 77 to also rotate, and since the gear teeth of the gears 77 are meshed with the teeth of a gear 36, keyed to shaft 24, shaft 24 will be driven in a clockwise direction. Thus the main shaft 24 is also driven.

A conveyor for moving the fruit to be pitted is provided and herein shown as an endless conveyor. To this end rails 88 and 90 are provided on which the cup carriers of the endless conveyor are adapted to slide. These opposed, spaced apart rails 88 and 90 are secured to brackets 92 by bolts 94. These brackets are secured to the side plates 2 by bolts 95. A return rail 96, see Figures 1 and 2, is provided to keep the cups in position as they pass back to the infeed end of the machine. This rail is supported by the brackets 98, see Figure 1, and starts at the position 97 in Figure 1 and is in alignment with a movable track carried by a slide mechanism hereinafter described, when the slide mechanism and track are in lowered position. A chain 100 is utilized to provide fruit cup carriers, as shown in Figure 1. For purposes of convenience, the chain is illustrated as an RC80 roller chain with K1 attachments every six inches. The cup carriers consist of shoes 102 which are connected by a plate 104, see Figure 14. The K1 attachment of the chain is secured to the plate 104 by bolts 104'. One side of the shoes 102 is provided with a tube 106 which forms a vertically disposed tubular bearing 108 for the cup stem to slide through. The tube 106 is provided with a slot 109. The fruit cup is made up of the cup 110 with the downwardly projecting stem 112. The lower end of the stem 112 has threaded into it the stud 114 carrying a roller 116. The stud passes through the slot 109. When the cup stem 112 is put through the bearing 108 and the stud 114 with the roller 116 is screw threaded into the stem 112 and through the slot 109, an assembly is obtained by which the cup can rise or fall in the vertical tubular bearing 108 and the stem will be kept from turning because the stud 114 slides in the vertical slot 109.

Means is provided efficiently to pit half fruits including half peaches which vary in size, and to this end mechanism is provided for positively pulling the cups down, and reversely for normally resiliently raising the cups by means of a spring to a position commensurate with the half peach being pitted. Secured to the shaft 24 is a cam 120 which acts on a roller 122. This roller is studded onto a lever 124, see Figure 12, which lever is rotatably mounted on a stud 126 secured to the side plate 2 by the nut 128. The long end of the lever 124 is provided with a slot 130 which slot receives a roller 132 studded in a boss 134 on the upper end of a cup operating slide 136, see Figure 13. The slide 136 is provided with two spaced apart roller tracks 138 and 140 which extend at right angles therefrom in spaced apart relation and which at the proper time receive therebetween the cup roller 116. The vertically movable slide 136 is provided with a stationary bearing or guide member 142 which is bolted to one of the side plates 2 by bolts 144. This bearing member 142 is provided with vertically disposed grooves formed by plates 146 to form a slideway for the slide 136 to move up and down in. Secured to the lower end of the slide 136 is a spring rod connector 148 which is studded into the slide by means of the stud 150. The spring rod 152 is threaded into the connection 148 and the rod passes through a suitable hole in the stationary cross support of the base 6.

A compression spring 154 surrounds the rod 152 and has at its upper end the adjusting nut 156. This adjustment is for the purpose of providing an adjustable pressure on the face of the peach when necessary while the peach is being pitted.

The roller 116 thus rides between the tracks 138 and 140. These tracks are made just long enough on the starting side so that as the conveyor moves the roller 116 carried by each cup device is entered horizontally fully between the tracks 138 and 140 so that the cup may be lifted up to the pitter pad. So long as the pressure is exerted on the peach by the spring 154, track 138 is not really necessary because all of the pressure is on the track 140. However since the tracks are positively depressed by the action from the cam 120, and since the cups might stick when in the upper position, the upper track 138 is provided so as to positively pull the cup down, away from the pitting head by pressure of the upper track 138 upon the roller 116.

*The pitting mechanism*

The pitting mechanism shown in Figures 6, 7, 8 and 9 consists of a pitter head 158 which has two projecting, oppositely extending, outstanding arms 160 and 162. Secured to these arms are two spaced apart rails or bars 164 and 166, see Figure 7, which rails are secured to the two arms 160 and 162 by bolts 168 and 170 and also by the studs 172 and 174. The studs 172 and 174 also form the journals for the upper ends of the swing arms hereinafter to be described.

Figures 10, 11:
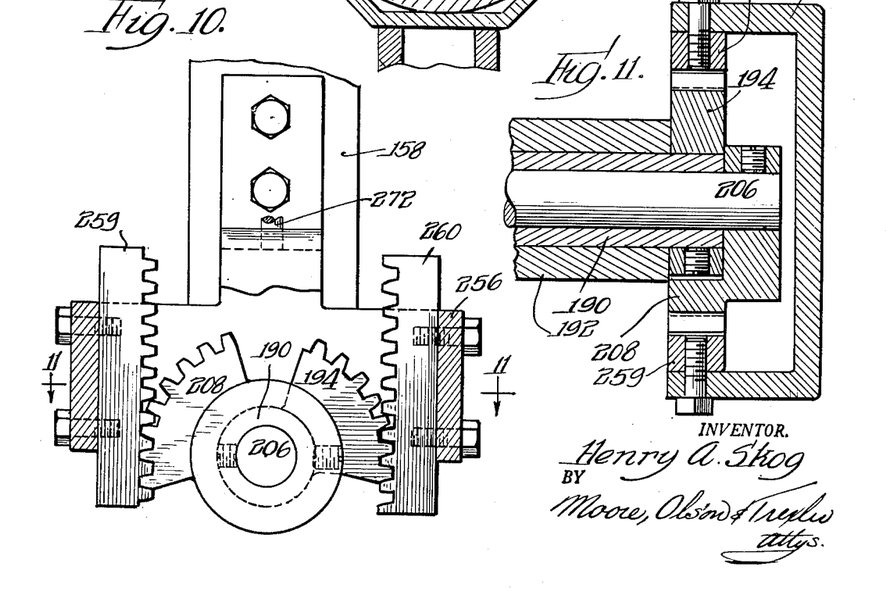
Figure 10 is an enlarged detail sectional view taken on the line 10—10 of Figure 6.
Figure 11 is a plan section taken on the line 11—11 of Figure 10.

Pitting blades 176 are secured to blade carriers. The pitting blade carrier for blade 176 is made up of the boss 182, a lever 184, a cross member 186, a lever 188, and the boss 189. This boss 189 has a projecting sleeve-like shaft 190 which passes through a bearing 192 and has secured to its outer end a segment gear 194, see Figure 11. On the other hand, the pitting blade carrier for blade 178, see Figure 6, comprises the boss 196, the lever 198, the cross member 200, the lever 202 and the boss 204. This boss 204 has extending through the sleeve shaft 190 a smaller shaft 206 which in turn has secured to its outer end the segment gear 208, see Figures 5, 6, 7 and 11.

Figure 5:
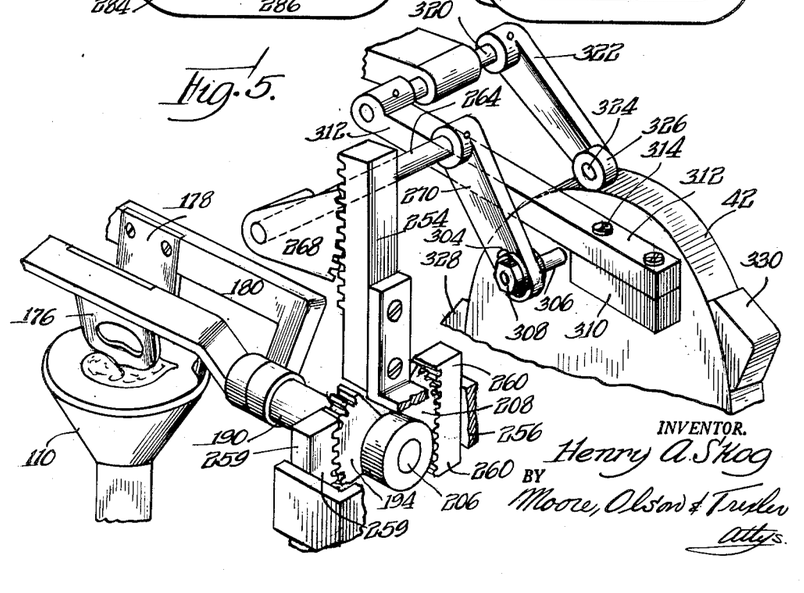
Figure 5 is a perspective view of parts shown in Figures 3 and 4 and also showing the pitting blades and their direct operating mechanism.
Figure 6:
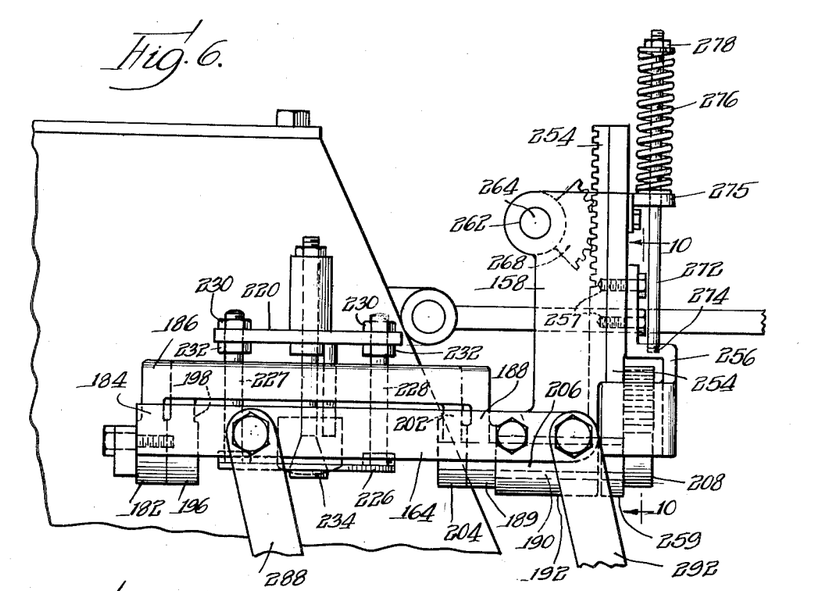
Figure 6 is an enlarged side elevational view of the pitter head.
Figure 7:
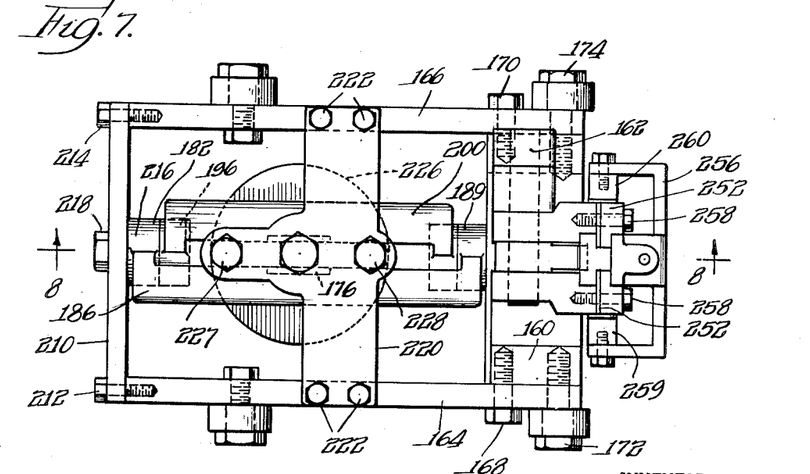
Figure 7 is a plan view of the pitter head shown in Figure 6.
Figure 8:
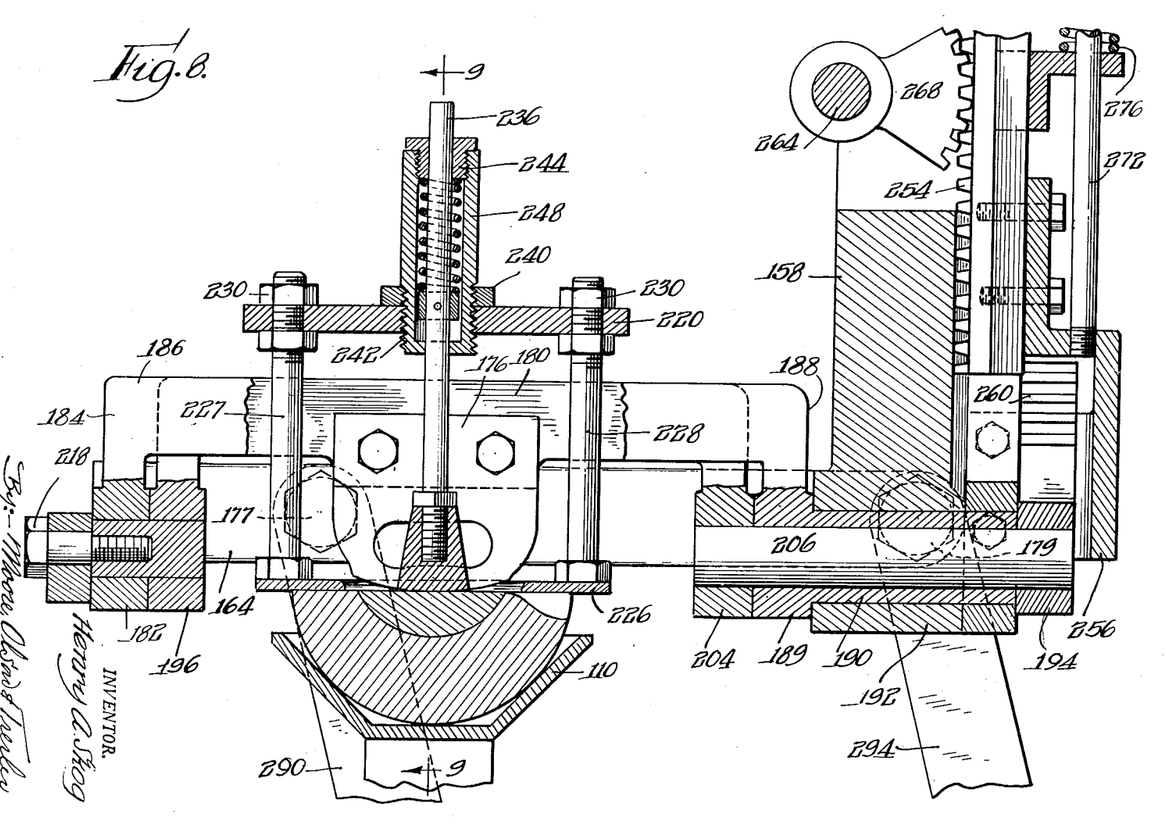
Figure 8 is an enlarged vertical section of the pitter head taken on line 8—8 of Figure 7.

In addition, this pitter head 158 comprises a cross bar 210, see Figure 7, which is bolted to the ends of the rails 164 and 166 by bolts 212 and 214. In addition, a stud bolt 216 is secured to the cross bar 210 by a nut 218, see Figure 8. This stud bolt 216 passes through the bosses 182 and 196 of the pitting blade carriers, thus forming a journal about which the bosses of said carriers turn, and thereby giving support to the outer end of the pitting blade carriers. The pitter head 158 in addition includes a support for a pitting pad and a knockout pad. This support comprises a plate 220, see Figures 7 and 9, secured across the rails 164 and 166 by bolts 222. These bolts pass through spacing blocks 224, see Figure 9, and thread into the side rails 164 and 166. The pitting pad 226 carried by the pitter head is supported from the plate 220 by spaced rods 227 and 228, see Figure 8. The position of this pitting pad 226 can be adjusted with respect to the pitting blades by the nuts 230 and 232. Thus, if it be desired to cut deep into the flesh of the half fruit, the pad 226 may be adjustably raised so that the pitting blades project further below the underside of the pitting pad, or vice versa. A knockout pad 234 is secured to the lower end of the knockout pad stem 236, see Figures 8 and 9. A barrel 238 is threaded into the plate 220 and is held securely by a nut 240. The knockout pad stem has pinned to it a collar 242 and a retaining nut 244 is screwed into the upper end of the barrel 238. A spring 246 is placed between the collar 242 and the nut 244, so as to create a normal downward urge to the knockout pad 234. The pitter head 158, see Figure 2, is provided with a bearing 248 through which the shafts 190 and 206, see Figure 8 also of the pitting blade carriers pass. A groove 250, see Figure 2, cut in the pitter head, cooperating with plates 252, produces a slideway in which the rack 254 can vertically slide, see Figures 2, 6, 7, 8, and 10. The bracket 256, see Figures 6, 7 and 8, is secured to the lower end of the rack 254 by means of bolts 257. Secured to this bracket 256 are two short racks 259 and 260, see Figures 7, 10 and 11. These racks mesh with the segment gears 194 and 208. The upper end of the pitter head 158 is provided with a bearing 262, see Figure 6, through which passes a shaft 264. A space or slot is provided to receive the segment gear 268 which is keyed to this shaft 264 and the teeth of which segment mesh with the rack 254. The outer end of the shaft 264 has keyed thereto the pitter lever 270, see Figures 5 and 8.

Means are provided which are operable so that as soon as the pitting blades have completed their cut the blades will immediately resume their normal open position, ready for the next cup. To this end a rod 272 is threaded into the bracket 256, as shown in Figure 6, as at 274. This rod passes through a hole in the bracket 275 carried by the pitter head. A spring 276 is provided to create an upper urge against an adjusting nut 278. Hence the spring 276 normally operates the two racks 259 and 260 which in turn move the pitter carriers shown in Figure 5 to move the pitter blades 176 and 178 into normal open position.

Figure 3:
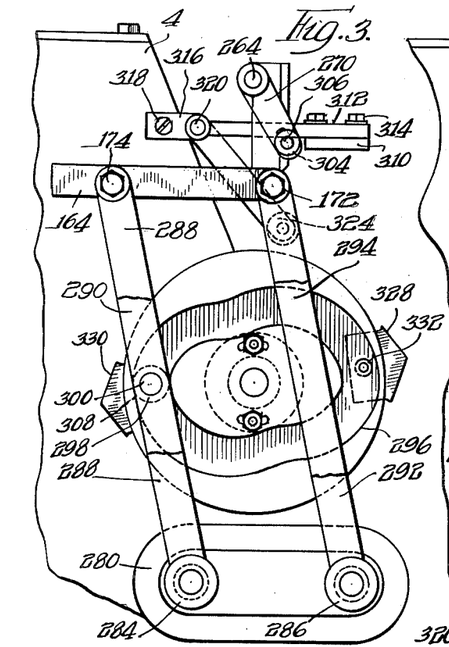
Figure 3 is an enlarged view of the cam mechanism and parallelogram of levers for swinging the pitter carriage in an arcuate path while maintaining the pitter horizontal during its travel.
Figure 4:
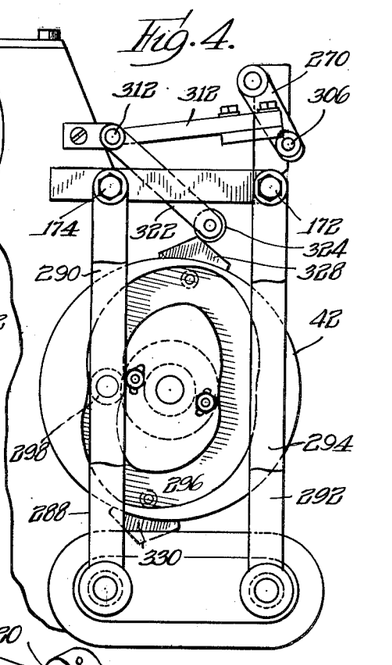
Figure 4 is a view corresponding to Figure 3, showing the mechanism in a different position.
Figure 9:
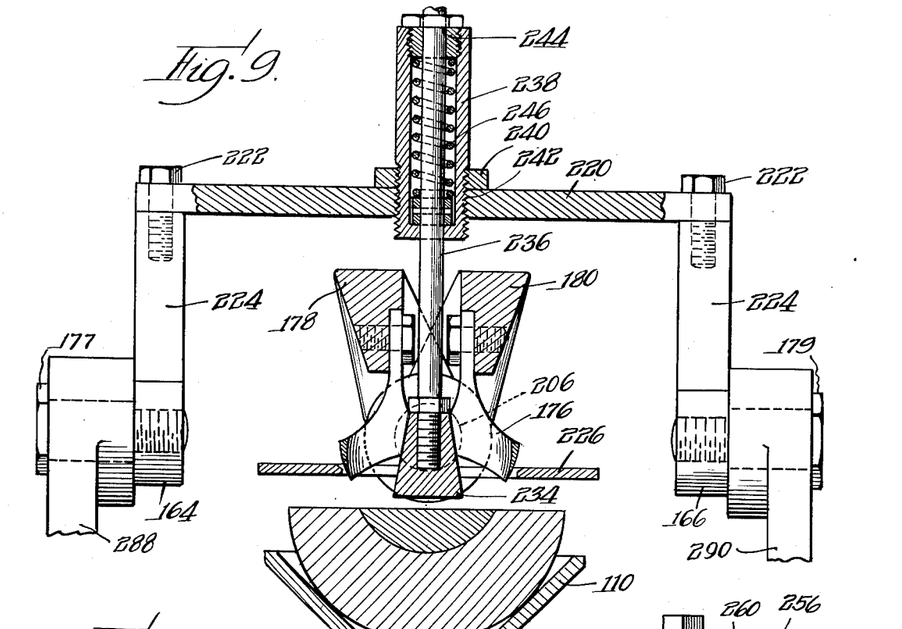
Figure 9 is a vertical cross sectional view of the pitter head taken on the line 9—9 of Figure 8.

Means is also provided for oscillating the pitting head 158 upon the upward arcuate movement of the pitting head in such a manner that the fruit engages the pitting pad 226, and so that the pitting blades 176 and 178 of the pitting head perform the pitting and the fruit and pitting pad disengage, all carried out solely on the upward arcuate movement of the pitting head. To this end the pitting head 158 is mounted to move in an arcuate path by being mounted upon a group of oscillatable levers now to be described. In order to carry out the foregoing, by reference to Figure 2 it will be seen that there are two bearing plates 280 and 282 mounted on the side plates 2 and 4 constituting the base of the machine. These two bearing plates 280 and 282 are each provided with spaced apart bearings 284 and 286, see Figure 1. Perforations in the rails 164 and 166 receive pairs of studs 172 and 174, 177 and 179 (Figs. 4, 8 and 9). The studs of each pair are spaced apart the same distance as the bearings 284 and 286. In addition, four rods or bars 288, 290, 292 and 294 are provided with perforations equally spaced apart and registering with the perforations in the bearings 284 and 286 and the rails 164 and 166. This arrangement, as shown in Figures 3 and 4, provides a parallelogram which causes the pitting head, including the rails 164 and 166, to move forward or to the right as viewed in said figures, with an arcuate travel. However, during this movement a line through the centers of the studs 172 and 177 will always remain in a horizontal position.

The cam 42 on the shaft 24 hereinbefore described has formed in its face a cam race 296 in which the roll 298 moves, Figures 2, 3 and 4. A cam roll stud 300, see Figure 3, is secured directly on one of the arms, such as 290. The cam roll race of the cam 42 is so designed that during the pitting cycle the pitting head and the fruit cups move together at the same speed. Since there are provided twelve teeth in the chain sprockets, and since the cups are spaced six links apart, and because the cam 42 is on the same shaft as the sprocket 40, the cam must produce two cycles of pitting and return for every revolution of the cam. The pitter lever 270 which is rigidly mounted on the end of shaft 264 carried by the pitter head, see Figures 1, 3 and 4, is provided with a slot 304, see Figure 5, into which is secured a stud 306 by means of a nut 308. A short bar 310 is secured to a longer bar 312 by means of screws 314. A bearing 316, see Figures 3 and 5, is secured to the side plate 4 of the base of the machine by means of a bolt 318. A shaft 320 passes through the bearing 316 and has fixed or keyed to its outer end the longer bar 312. At its opposite end the shaft 320 has fixed or keyed thereto the lever 322. This lever 322 is provided with a stud 324 on which is mounted the roller 326. Two bumper cams 328 and 330 are bolted to the periphery of the cam 42 by bolts 332. These cams act on the roller 326 as hereinafter explained.

Figures 12, 14:
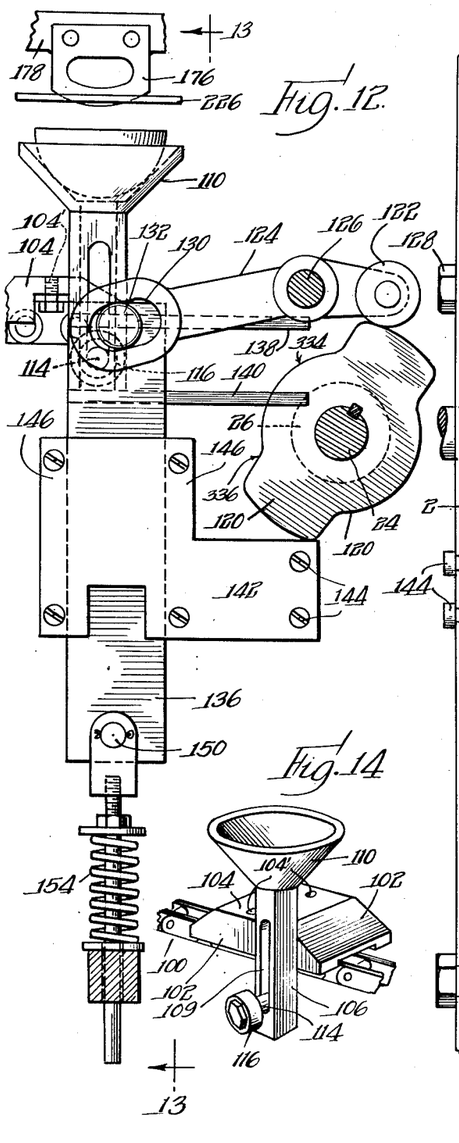
Figure 12 is a detail view of the fruit cup raising and lowering means.
Figure 14 is a perspective view of the fruit cup.
Figure 13:
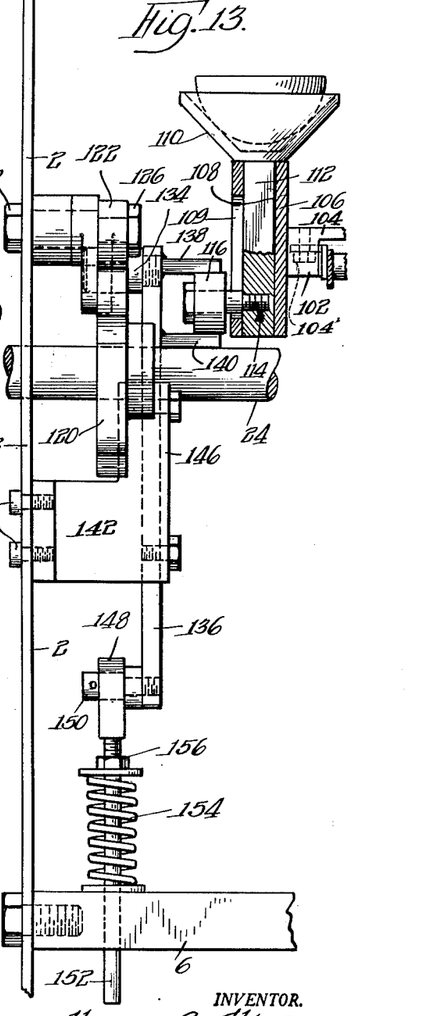
Figure 13 is a section taken on the line 13—13 of Figure 12.

The present machine is designed to operate on peaches or other fruit which have been bisected or severed preferably diametrically along a plane that passes through the suture plane or substantially parallel to the suture plane, producing two half peaches each of which has a half pit disposed naturally in situ thereon, and this machine is adapted also to repit half peaches of the foregoing type which have been missed on other machines, although obviously it is not so limited, as it can be used to pit half peaches which have not been run through other machines. In any event, half peaches are placed in the cups 110 any place along the open path marked "Feed Position," see Figure 1, with the cut face uppermost. Since this machine is designed to also take care of pits missed by previous machines, particularly split pits which are large, the pitting blades are set to make a cavity larger than normal. This setting of course is not necessary where the pits are not larger than normal. However the half peaches are placed or may be placed in the cup with a disregard to the longitudinal axis of the pit. In short, the half peach is placed in the cup whichever way the operator happens to pick it up, provided the cut face is uppermost. Each half peach is thus disposed in a travelling cup, and travels at a uniform constant rate of speed as carried by the chain conveyor in a continuous path, to the pitting station where the peach cup reaches the position under the pitting blade as shown to the extreme right in Figure 1. The mechanism is arranged so that the pitting head starts to move with the cup in an upward arcuate uniform motion due to the action of the cam 42 on the roller 298, see Figures 3 and 4, which is studded to the arm 290 forming one of the group of four arms arranged in a parallelogram and to the upper end of which is pivoted the peach pitter carrier 158, see Figures 6 and 7. The moment the pitting head 158 starts to move with the cup, the rotating cam 120, see Figures 12 and 13, allows the roller 122 to drop to the point on the cam shown by the line 334 of Figure 12. This releases the vertically movable slide 136 which has been held down against the urge of the spring 154. The slide therefore will be pushed upwardly by the spring 154 and because the roller 116 on the cup stem, in this particular position, has entered between the rails 138 and 140 on the slide 136, the cup will be raised up by spring 154 until the cut face of the half fruit in the cup contacts the underside of the pitter pad 226. This occurs during substantially the first half inch of travel of the upward arcuate movement of the pitter head. The actual pitting thereafter takes place in about two and one half inches of upward arcuate travel of the pitter head and occurs while the roller 122, shown in Figure 12, rides on the cam surface 334 which in arcuate length is a constant. When the pitting blades have finished their cut, the roller 122 strikes the camming surface 336 of cam 120 as shown in Figure 12, which causes the roller 122 to be raised up, thereby lowering the peach cup. This lowering of the peach cup also takes place in about one half inch of the cup travel, and all of these hereinbefore described actions take place during the upward arcuate swing of the pitting head, that is, the fruit half does not contact the pitting pad 226 until the upward arcuate swing of the pitting head has started, and the fruit half has lowered away from this pitting pad 226 before the end of the upward arcuate swing in the reverse direction of the pitting carrier 158. The downward arcuate swing in the reverse direction of the pitting carrier 158, see Figures 15 and 16, occurs only when the pitting head is returning to its starting position, that is, when it is travelling in the opposite direction from that which the cups are travelling. The adjusting collar 44, shown in Figure 2, is provided so that the exact timing can be obtained between the fruit cups and the travel of the pitting head. The pitting blade carriers operate the same as the pitting mechanism shown and described in my prior Patent 2,216,165, issued October 1, 1940 to Raymond L. Ewald and Henry A. Skog, with the exception that the use of the pit locating means is not used. In short, the blades swing through a fixed arc about a center which corresponds to the center line of the shafts 216 and 206, as shown in Figures 8, 9, 10 and 11.

When the pitting head 158 has moved forward about one half inch on its upward arcuate movement, the bar 310, see Figures 3, 4, and 5, contacts the stud 306, on the arm 270 causing the shaft 264 to turn clockwise. At the end of the pitting cut the cam 328 contacts the roller 324 and through the lever 322, the shaft 320, and the lever 312, the short stop or bar 310 is lifted away from the stud 306, thereby terminating the cutting stroke of the pitting blades. Since the shaft 264 on the pitter head is caused to turn clockwise, and since the segment gear 268, see Figure 5, is meshed with the gear teeth of the rack 254, the turning of the shaft 264 will cause the rack 254 to move downwardly. Since the bracket 256 is bolted to the lower end of the rack 254 and since the two short racks 259 and 260 are carried by the wings of the bracket, and since the gear teeth mesh with the gear teeth of the segment gears 194 and 208 on the pitter blade carriers, therefore as soon as the racks move downwardly the shaft 206 will be turned in an anticlockwise direction because the segment gear 208 is keyed thereto and the shaft 290 will be turned clockwise since the segment gear 192 is keyed thereto. Since the pitting blade carriers for the blades 176 and 178 are secured to the shafts 190 and 206, the turning of these shafts will cause the pitting blades to cut down around the pit and meet on the underside thereof. Hence the pitting movement of the pitting blades is caused by the movement of the shaft 264 which in turn is caused by the arcuate upward movement of the pitting head which causes the stud 306 carried thereby to contact the bar 310 carried on the pivotally mounted carrier 312.

As hereinbefore stated, means is provided to return the pitting blades to an open position as soon as they have completed the cut. This comprises the rod 272 and the compression spring 276. While the racks are moving downwardly the spring 276 is compressed, causing an upward urge to the rod 272 between the shoulder of the bracket 275 and the adjusting nut 278. As soon as the stud 306 has been released from the short bar 310, the spring 276 forces the racks up, thereby opening the pitting blades. The knockout pad operates to press or knock the pit down onto the peach from which it was cut, or at least to drop it so that it will not fall onto the oncoming half peach to cause interference with the subsequent proper pitting. This knockout pad, as shown in Figure 8, is located about three-sixteenths of an inch below the pitting pad 226. When a half peach is being pitted the knockout pad 234 is lifted flush with the main pad 226 which has an opening through which the pad operates. This lift of the knockout pad may even be higher as the pit rises while being severed, due to the thickness of the pitting blades.

Figure 15:
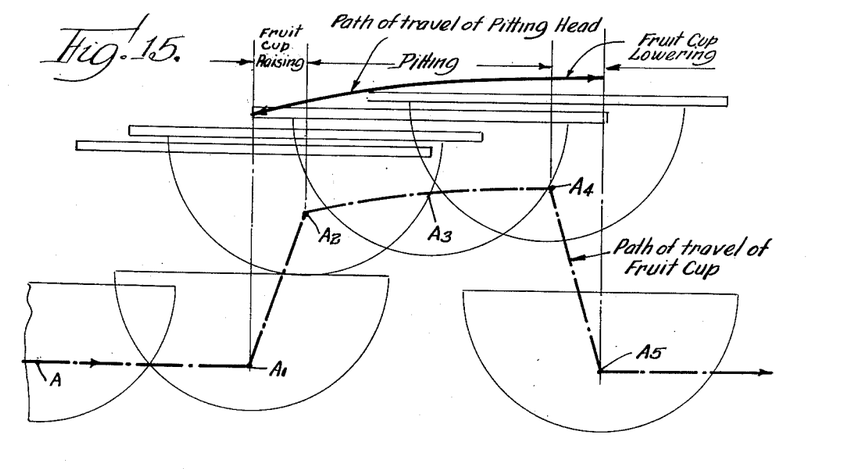
Figures 15, 16 and 17 are diagrammatic views showing the path of travel of the fruit cup in cooperation with the fruit pad of the pitting mechanism.
Figure 16:
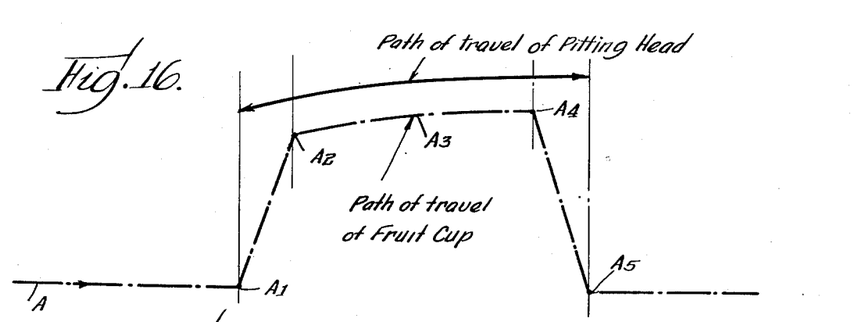
Figure 17:
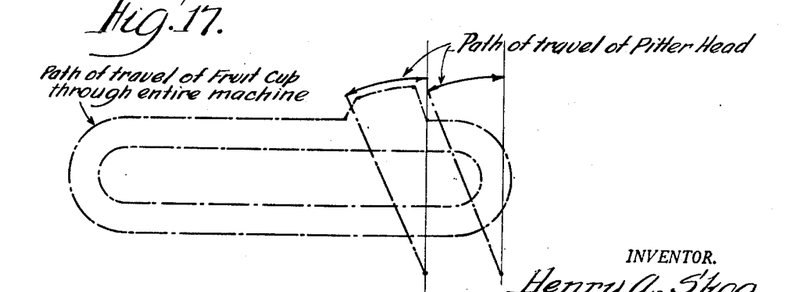

It will thus be apparent that in the present invention I have provided a continuously operating pitting machine for pitting half pits from half peaches wherein a series of half peaches, each placed in a half cup with its longitudinal stem axis arranged in any direction, is carried in spaced apart relation continuously under a pitting station, and wherein during the continuous, uninterrupted travel of the fruit holding mechanism carrying the half peaches, the pitting action is carried out without interrupting the movement of the half peach by pitting mechanism which moves with the half peach at the same rate of travel as the moving half peach. And furthermore it is apparent that the pitting action is accomplished by raising the half peach upwardly and moving it along as it raises upwardly to meet an upwardly arcuately moving pitter plate having an opening through which the pitter blades operate on the cut face of the half peach to sever the pit therefrom. As hereinbefore explained, the pitting action is carried out as the pitter blades travel arcuately upwardly, as illustrated in Figs. 15 to 17, by raising the cup and thus the half peach from its path A along the path A1 to A2, Figs. 15 and 16, so that the half peach contacts the apertured pitter plate, and it is during this upward arcuate travel of the pitter head and the apertured pitter plate, and during the movement of the half peach along the path A3, Figs. 15 and 16, and while the cut face of the half fruit is in contact with the underside of this apertured pitter plate, that the pitter blades themselves are actuated to move arcuately through the cut face of the half fruit in opposite directions until they meet on the underside of the half pit, thus causing the half pit to be severed from the flesh of the fruit. Furthermore, after the pitting action, and while the pitter head and the apertured pitter plate are still moving arcuately upwardly, as shown in Figs. 15 and 16, the cup with the half fruit therein is shifted downwardly along the path from A4 to A5 and away from the upwardly travelling pitter head, until the proper clearance is provided, and then, and not until then, does the pitter head with its apertured plate start its return movement arcuately downwardly so that when it reaches the opposite end of its arcuate downward movement and picks up the next succeeding cup in the continuous travel of the succession of the cups, does the pitter head reverse its direction of movement and again proceed in an upward arcuate travel as hereinbefore described. It will be noted that in all these movements the pitter head and its apertured pitter plate are mounted to swing arcuately on the four elongated arms forming a parallelogram movement whereby the pitter head will always remain horizontal while at the same time it will swing arcuately upwardly and thence arcuately downwardly in a reverse direction while superimposed over the path of travel of the underlying series of continuously moving fruit cups.

It will thus be seen that by means of the present construction wherein the relatively heavy pitting head is swung back and forth on the relatively long, pivotally mounted arms, the weight of the pitter head is borne by these arms. The cut face of the half fruit during the movement of the pitter head is moved resiliently upwardly into contact with the apertured plate of the pitting head whereby the weight of the pitting head on the cut face of the half fruit is eliminated and whereby a gentler pitting action takes place, and unnecessary wear on the mechanical parts is eliminated. Also as an advantage of the present construction I have eliminated the necessity of providing a compensating spring so that the weight of the pitter head does not rest on the cut face of the half fruit and thereby have eliminated any possibility of the pitter head bouncing from the cut face of the half fruit and missing the pitting action. On the contrary, by the provision of the movement of the relatively light cup carrying the half fruit into contact with the pitter pad of the pitter mechanism by means of a spring tension, sufficient pressure is ensured to accomplish proper pitting and at the same time to prevent marring of the fruit. The tension of this spring 154 is adjustable so as to provide the desired results. Another advantage of the present invention is that I have provided a continuously operating device for pitting half peaches or other similar fruits in continuous fashion and with the maximum speed and in an automatic manner.

Certain features of the present invention are applicable to the pitting of cherries and other fruits. Instead of using the arcuate blades 176 of the present invention and the associated specifically cooperating pitting mechanism, there may be substituted therefor other types of mechanism, such for instance as mechanism for pitting cherries or other fruits capable of being pitted. However, in this type of mechanism a suitably shaped fruit holder will be utilized in association with the arcuately upward travel of the pitter head and the resiliently upward movement of the fruit holder in the manner described herein so that continuous pitting is effected on the forward continuous travel of the fruit cup without interrupting its motion.

So also the broad features of this invention are adaptable in association with still larger automatic machines involving a pitting operation and which use the broad subject matter of this invention, to-wit the provision of continuous pitting utilizing a forwardly uninterruptedly moving fruit holder in association with an arcuately, upwardly advancing pitter head, and wherein the fruit holder is raised upwardly to meet the pitter head or to be positioned adjacent the pitter head on the upper arcuate movement of the pitter head in the manner herein described.

Obviously the invention is not limited to the specific details of construction disclosed herein but is capable of other modifications and changes without departing from the spirit and scope of the appended claims.

Having thus described the invention, what I claim as new and desire to secure by Letters Patent is:

1. In a fruit treating machine, a traveling pitter for pitting a fruit half while it is moving, said traveling pitter comprising a supporting frame, a plurality of parallel links supporting said frame for traveling movement, a pitter blade carried by said frame for movement therewith and relative thereto to pit a fruit half during the traveling movement of the pitter frame, actuating means for said pitter blade comprising an operating member mounted on said frame and operatively connected to said pitter blade, and an actuating member shiftably mounted for movement on a fixed axis and positioned in the path of movement of said operating member to engage and move said operating member during travel of the pitter frame, means for moving said frame forwardly and backwardly and means operable in timed relation to said frame moving means for shifting said actuating member to release said actuating member from the said operating member at a predetermined point in the travel of said frame.

2. In combination, a supporting frame, a plurality of substantially vertically disposed spaced and elongated parallel links each pivotally supported adjacent one end thereof on said frame for swinging movement, a pitter head pivotally mounted on and adjacent opposite ends of said links for arcuate movement so that said pitter head also remains horizontal, means for simultaneously operating said links arcuately to swing said pitter head in an ascending arcuate path and then reversely, conveyor means comprising a succession of fruit holders, means for moving said fruit holders along a path which includes a portion rising in substantial adjacent parallelism with said pitter head and beneath the same and at the same speed as the rate of movement of said pitter head when traveling said rising path, shiftable pitter means on said pitter head, and means operable as said pitting means and fruit in a fruit holder travel together along said rising path for cutting the fruit.

3. In combination, a supporting frame, a plurality of substantially vertically disposed spaced and elongated parallel links each pivotally supported adjacent one end thereof on said frame for swinging movement, a pitter head pivotally mounted on and adjacent opposite ends of said links for arcuate movement so that said pitter head also remains horizontal, means for simultaneously operating said links arcuately to swing said pitter head in an ascending arcuate path and then reversely, conveyor means comprising a succession of fruit holders, means for moving said fruit holders along a path which includes a portion rising in substantial adjacent parallelism with said pitter head and beneath the same and at the same speed as the rate of movement of said pitter head when traveling said rising path, shiftable pitter means on said pitter head, and means operable as said pitting means and fruit in a fruit holder travel together along said rising path for cutting the fruit, and means for relatively separating said pitter means and fruit in said holder before said pitter head reversed its travel.

4. In combination, a stationary support, a pitter head, means for mounting said pitter head for movement on said support about an arcuate path which includes a portion rising above a horizontal plane, means for reciprocating said pitter head forwardly and reversely along said rising portion, a series of spaced half fruit holders for supporting a half fruit with its cut face exposed, means for continuously forwardly moving said fruit holders successively along an arcuately rising path a portion of which lies adjacent and parallel to said rising path of movement of said pitter head, said fruit holder moving means moving said holders at substantially the same speed as said pitter head when so moving along said arcuately rising path, pitting means mounted on said pitter head, means for operating said pitting means to move relatively to said head and cut into the cut face of a half fruit while said pitter head and half fruit are moving along said rising path, and means operative on the termination of said pitting operation for relatively separating the fruit holders and pitting means prior to the reversal of movement of said pitter head.

5. A fruit pitting machine comprising a conveyor means for moving said conveyor at a substantially constant rate of advance over a path including a substantially horizontal portion, a succession of spaced fruit holders shiftably mounted on and shiftable relatively to and from said conveyor and each adapted to hold a half fruit with its cut face uppermost, pitting mechanism mounted above a portion of the path of movement of said conveyor, means for reciprocating said pitting mechanism forwardly and backwardly above at least a portion of said horizontal path of travel of said conveyor, said last named means including mechanism for advancing said pitting mechanism for a portion of its forward travel in the direction of advance of said conveyor at the same rate of advance as the conveyor to maintain said pitting mechanism for a predetermined time interval superimposed over one of said fruit holders so mounted on said conveyor, means for raising said fruit holder during a portion of the forward travel of said pitting mechanism to position a half fruit in said carrier adjacent said pitting mechanism, and means for operating said pitting mechanism while the surface of said half fruit is so adjacently positioned to pit the fruit.

6. A fruit pitting mechanism comprising a succession of spaced carriers movable at a substantially constant rate of advance along a path of substantial length, pitting mechanism mounted adjacent said path of travel of the carriers, means for reciprocating said pitting mechanism arcuately back and forth in a substantial linear path with respect to a predetermined portion of the path of travel of said carriers, one end of said arcuate path being closer to the path of travel of the carriers than the opposite end of the arcuate path, said last named means including mechanism for advancing said pitting mechanism in the direction of advance of said carriers at the same rate of advance as said carriers adjacent said portion of said path of travel of the carriers to maintain said pitting mechanism for a predetermined time interval moving adjacently to said path of travel of said carriers and at the same rate of speed as said carriers, and means operative during said advance of said pitting mechanism for moving the adjacently positioned carrier with the half fruit contained therein toward said pitting mechanism to position the cut face of the half fruit into the zone of operation of said pitting mechanism as said pitting mechanism and said half fruit are moving at the same rate of speed in the same direction, and means operative during said last named movement for operating the pitting mechanism to pit the half fruit.

7. A device for pitting half fruits comprising a support, means mounted on said support providing an endless conveyor including a succession of spaced fruit holders each adapted to hold a half peach with its cut face outwardly exposed and a pit disposed in situ therein, means for uninterruptedly moving said conveyor over a predetermined linear path disposed in a single plane and at a uniform speed, means operative during the travel of said conveyor over said linear path for laterally moving said fruit holders away from and then adjacent but spaced from said path for a predetermined time and then back into said path of said conveyor, pitting mechanism mounted on said support, means for moving said pitting mechanism longitudinally of and substantially parallel to said adjacent path of movement of said fruit holders for a predetermined portion of the adjacent spaced path of travel of said fruit holders and at the same rate of travel as said fruit holders to position the cut face of the half peach into contact with a portion of the pitting mechanism to cause said contacting half fruit and said pitting mechanism to travel together at the same speed, and means operable while they are so travelling together for actuating the pitting mechanism to pit the half peach, said fruit holder actuating means being operable upon the completion of the pitting operation for pressing the cut face of the half fruit away from the pitting mechanism.

8. In a machine of the character described, a continuously moving fruit conveyor movable over a path at a substantially constant rate of advance, a succession of spaced apart fruit holders mounted on said conveyor, means for moving each fruit holder progressively outwardly of and then toward said conveyor during the travel of said conveyor, pitting mechanism movable to pit half fruit carried in each of said fruit holders, supporting means for said pitting mechanism, means for moving said supporting means to and fro over substantially the same path overlying the path of travel of said conveyor, said path of travel of each fruit holder and said pitting mechanism supporting means substantially converging during a portion of the outward movement of each fruit holder and as it travels with said conveyor whereby during such substantially converging movement the fruit holder and said supporting means for said pitting mechanism move for a predetermined time interval at the same speed, and means for actuating said pitting mechanism relatively to its supporting means and toward the half fruit to pit fruit on a holder during the movement of one of said fruit holders in outwardly moved position on said conveyor.

9. In a machine of the character described, a continuously moving fruit conveyor movable over a predetermined path at a substantially constant rate of advance, said conveyor including a succession of spaced fruit holding devices each adapted to hold a half fruit with its cut face exposed and containing a pit section, means operable during a predetermined portion of the path of travel of the conveyor for moving each fruit holder in succession outwardly away from the path of travel of said conveyor and thereafter inwardly toward the path of travel of said conveyor, pitting mechanism movable to pit fruit held in each of said fruit holders, support means for said pitting mechanism including spaced means for contacting the cut face of the half fruit, means for moving said support means to and fro over substantially a common path overlying the path of travel of each successive fruit holder on said conveyor, said path of outward movement of each cut face of each half fruit in each of said fruit holders substantially converging with the path of travel of said spaced means of said pitter supporting means whereby to cause the cut face of the half fruit to contact therewith and move with the same speed as the spaced fruit contacting means of the pitter supporting means for a predetermined portion of its travel in one direction, and means carried by said pitter supporting means and operable relatively to and through said fruit contacting means to pit fruit carried by said fruit holder while said pitter supporting means is moving in the direction of travel of said conveyor with the cut surface of the half fruit in contact with said spaced fruit contacting means.

10. A fruit pitter comprising a conveyor, means for uninterruptedly advancing the conveyor forwardly at a predetermined rate along a predetermined path, a pitter carrier means for moving said carrier forwardly and reversely along a path spaced from but extending alongside and generally parallel with a portion of the path of travel of said conveyor, pitting mechanism mounted on said pitting carrier, a fruit holder shiftably mounted on and relatively to said convyeor, means for moving said fruit holder containing a half fruit with its cut face outermost, relatively to said conveyor and toward said pitter carrier while the pitter carrier is moving with and in the direction of travel of the conveyor, said fruit holder moving means including means for resiliently pressing the cut face of the half fruit into contact with the pitter carrier, and mechanism for actuating the pitting mechanism on the pitter carrier relatively to the carrier and toward the half fruit for pitting the half fruit when the cut face of the half fruit is contacting and moving at the same speed as the pitter carrier.

11. In a device of the class described, the combination of a conveyor, means for moving the conveyor along a predetermined path at a constant rate of speed, a fruit carrier, shiftably mounting said fruit carrier on said conveyor for movement away from and toward said conveyor, a pitter carrier having spaced apart members for contacting the cut face of a half fruit, pitting mechanism shiftably mounted on said pitter carrier and operable relatively to and between said spaced apart members, means for moving said pitter carrier reciprocably along a path generally longitudinally of and laterally of the path of travel of the conveyor, said means including mechanism for moving the pitter carrier as it moves along said path in the direction of advance of the conveyor, at the same rate of travel as the conveyor, and means operable during said last mentioned advance for projecting the fruit holder relatively to the conveyor and toward the pitter carrier and for projecting the cut face of the half fruit in said fruit holder carrying a half fruit with its cut face exposed into contact with the spaced fruit contacting members of the pitting carrier and whereby said half fruit thus moves in contact with said fruit contacting members and at the same rate of speed thereas, and means for then actuating the pitting mechanism on the carrier toward the cut face of the half fruit to pit the fruit.

12. A fruit pitter including a fruit holder for advancing a half fruit along a predetermined path at a predetermined constant rate of speed with its cut face uppermost, said path of travel of the fruit holder including an arcuately elongated portion disposed laterally of the remaining portion of said path of travel, a pitter support, means for moving said pitter support for arcuate movement forwardly and reversely along a second path of travel disposed substantially parallel with and spaced above the lateral portion of said path of travel of the fruit holder, means for moving the pitter support in an upward direction along its arcuate path of travel while moving in the same direction as the fruit holder moves when moving along said lateral path of travel of the fruit holder, and for moving the pitter support at the same speed as said fruit holder moves when said pitter support is moving upwardly arcuately whereby said pitter support and the cut face of the half fruit travel together in said direction at the same speed and in adjacent positions, pitting mechanism movably mounted on said pitter support, and means for operating said pitting mechanism as said pitter support and the half fruit are moving upwardly and arcuately together along said lateral path for pitting the half fruit.

13. In a fruit treating machine, means for feeding a succession of fruit halves with their cut faces exposed at a continuous uniform rate along a predetermined path, a traveling pitter, mechanism for mounting said pitter for movement forwardly and backwardly parallel to said path, said mechanism including means for moving said pitter forwardly in synchronism with said feeding means and backwardly in timed relation with said feeding means to register with successive fruit halves, said traveling pitter comprising a traveling support, and a fruit engaging plate positioned successively to engage the exposed faces of each of the fruit halves in said feeding means on successive forward movements of the traveling pitter, said plate having an opening therein, pitter knife means, mechanism for mounting said pitter knife means for movement forwardly and backwardly with said pitter support and relative thereto through an opening in the plate for movement about the seed containing section of each fruit half to cut the seed section, and means for actuating said pitter knife means, said actuating means comprising a spring actuating member operably connected to said pitter knife means and carried by said pitter support, an operating member shiftably mounted on a fixed axis and positioned to engage said actuating member as the traveling pitter support moves forwardly whereby to move the said actuating member against the action of its spring, and means carried by the pitter support for releasing said operating member from said actuating member as the support approaches its forward limit of movement whereby said spring actuating member returns the pitter knife means to position for a subsequent pitting operation on the next successive forward movement of the pitter support.

14. In a fruit treating machine, a conveyor driven continuously at a substantially constant rate, a plurality of fruit holders, means for shiftably mounting said fruit holders for movement with said conveyor at said constant rate and for movement relatively thereto, pitting mechanism mounted over said conveyor and movable to engage and pit fruit in said holders, means for moving said pitting mechanism including a reciprocating support movable back and forth above said conveyor and over a path parallel with at least a portion of the path over which the holders are moved by the conveyors, means for advancing said pitting support in an elongated path in the direction of advance of said holders at the same rate of advance to maintain said pitting mechanism for a predetermined time interval superimposed over and traveling with a holder, and means for resiliently shifting said holders in succession relative to the conveyor and toward said pitting mechanism during said interval to move a halved fruit in each holder successively into registration with the zone of operation of the traveling pitting mechanism so that said pitting mechanism may engage and pit the half fruit, means for operating the pitting mechanism to pit each half fruit during said registration and means for positively shifting said holders successively relative to the pitting support conveyor in the opposite direction to disengage the fruit from the pitting mechanism after the pitting thereof.

15. In a machine of the character described, a conveyor movable continuously at a substantial constant rate, a plurality of fruit holders, means for shiftably mounting said fruit holders in spaced succession on said conveyor for movement therewith at said constant rate, and for movement transversely thereto, pitting mechanism, support means mounting said pitting mechanism for forward and backward movement over the conveyor, means for mounting said pitting mechanism for movement relative to its support means to pit the fruit, means for moving said support means forwardly with said pitting mechanism positioned over said conveyor and at said constant rate and backwardly to position the pitting mechanism over the next following fruit holder, means for successively shifting each of said holders relative to the conveyor to shift each half fruit successively into registering adjacency with the pitting mechanism during the advance or forward movement of said pitter support means in the direction of travel of said conveyor, and means for moving said pitting mechanism relative to said support means to pit the fruit in said holders while said holders are in shifted registering positions.

16. In a fruit treating machine, a conveyor having a plurality of spaced fruit holders for receiving and supporting fruit halves with their cut faces exposed, means for driving said conveyor at a continuous uniform rate, a traveling pitter for successively pitting the fruit halves in said holders while the fruit holders are moving, said traveling pitter comprising parallel links on opposite sides of said conveyor and extending at one end beyond the fruit holders, a pitter frame pivotally supported on portions of said links extending beyond said holders and positioned in juxtaposition to the path of movement of the fruit holders carrying the fruit halves, a pitter blade carried by said frame for movement therewith and relative thereto to pit a fruit half during the traveling movement of the pitter frame, means for actuating said pitter frame and said supporting links to and fro first in the direction of movement of the conveyor at the same rate of movement as the fruit holders and then reversely whereby the pitter blade is positioned for pitting engagement with the fruit halves of successive holders, actuating means for said pitter blade comprising an operating member mounted on said frame and operatively connected to said pitter plate and an actuating member positioned in the path of movement of said operating member to engage and move said operating member during travel of the pitter frame in the same direction as the fruit holders, and means operable in timed relation to said frame actuating means for shifting said pitter blade actuating member to release said actuating member from the pitter blade operating member prior to the reversal of movement of the pitter frame.

HENRY A. SKOG.

References Cited in the file of this patent

UNITED STATES PATENTS

| Number | Name | Date |
|---|---|---|
| 1,292,261 | Clifford | Jan. 21, 1919 |
| 1,617,909 | Jepson | Feb. 15, 1927 |
| 1,982,779 | Ayars | Dec. 4, 1934 |
| 2,216,165 | Ewald et al. | Oct. 1, 1940 |
| 2,329,212 | Nawman | Sept. 14, 1943 |
| 2,376,526 | Thompson | May 22, 1945 |
| 2,380,530 | Jepson | July 31, 1945 |
| 2,443,863 | Lindley | June 22, 1948 |

FOREIGN PATENTS

| Number | Country | Date |
|---|---|---|
| 7,877/27 | Australia | June 21, 1927 |
| 6,169/32 | Australia | Feb. 17, 1932 |